United States Patent
Tan et al.

(10) Patent No.: US 10,824,920 B2
(45) Date of Patent: Nov. 3, 2020

(54) METHOD AND APPARATUS FOR RECOGNIZING VIDEO FINE GRANULARITY, COMPUTER DEVICE AND STORAGE MEDIUM

(71) Applicant: BAIDU ONLINE NETWORK TECHNOLOGY (BEIJING) CO., LTD., Beijing (CN)

(72) Inventors: Xiao Tan, Beijing (CN); Feng Zhou, Sunnyvale, CA (US); Hao Sun, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 272 days.

(21) Appl. No.: 15/956,605

(22) Filed: Apr. 18, 2018

(65) Prior Publication Data
US 2019/0236419 A1    Aug. 1, 2019

(30) Foreign Application Priority Data
Jan. 26, 2018 (CN) .......................... 2018 1 0076682

(51) Int. Cl.
| G06K 9/00 | (2006.01) |
| G06K 9/46 | (2006.01) |
| G06K 9/68 | (2006.01) |
| G06F 17/16 | (2006.01) |
| G06T 7/11 | (2017.01) |
| G06T 7/162 | (2017.01) |

(52) U.S. Cl.
CPC .......... *G06K 9/6857* (2013.01); *G06F 17/16* (2013.01); *G06K 9/00744* (2013.01); *G06T 7/11* (2017.01); *G06T 7/162* (2017.01); *G06T 2207/10016* (2013.01); *G06T 2207/10024* (2013.01); *G06T 2207/20021* (2013.01)

(58) Field of Classification Search
USPC ........................................ 382/190, 165, 220
See application file for complete search history.

(56) References Cited

U.S. PATENT DOCUMENTS

| 2005/0172312 A1* | 8/2005 | Lienhart | H04N 21/458 725/19 |
| 2006/0187358 A1* | 8/2006 | Lienhart | H04N 21/812 348/661 |
| 2008/0313140 A1* | 12/2008 | Pereira | G06F 16/7837 |
| 2010/0054590 A1* | 3/2010 | Jiang | G06K 9/40 382/167 |
| 2011/0129017 A1* | 6/2011 | Oami | G06F 16/5838 375/240.24 |

(Continued)

*Primary Examiner* — Kathleen Y Dulaney
(74) *Attorney, Agent, or Firm* — Ladas & Parry, LLP

(57) ABSTRACT

The present disclosure provides a method and apparatus for recognizing video fine granularity, a computer device and a storage medium, wherein the method comprises: performing sampling processing for video to be recognized to obtain n frames of images, n being a positive integer larger than one; respectively obtaining a feature graph of each frame of image, and determining a summary feature according to respective feature graphs; determining a fine granularity recognition result of a target in the video according to the summary feature. The solution of the present disclosure may be applied to enhance the accuracy of recognition result.

21 Claims, 5 Drawing Sheets

(56) References Cited

U.S. PATENT DOCUMENTS

| | | | |
|---|---|---|---|
| 2011/0182469 A1* | 7/2011 | Ji | G06K 9/4628 |
| | | | 382/103 |
| 2013/0215264 A1* | 8/2013 | Soatto | G06T 7/207 |
| | | | 348/143 |
| 2015/0161450 A1* | 6/2015 | Kumar | G06K 9/48 |
| | | | 382/197 |
| 2017/0060867 A1* | 3/2017 | Moutinho | H04N 21/84 |
| 2017/0193286 A1* | 7/2017 | Zhou | G06K 9/00281 |
| 2017/0213359 A1* | 7/2017 | Zhou | G06K 9/6277 |
| 2017/0251931 A1* | 9/2017 | Prakash | A61B 5/6876 |
| 2019/0354766 A1* | 11/2019 | Moore | G06F 40/169 |

* cited by examiner

Video segment    Extract an image    Feature graph    Attention mechanism and redundancy restrain mechanism

METHOD AND APPARATUS FOR RECOGNIZING VIDEO FINE GRANULARITY, COMPUTER DEVICE AND STORAGE MEDIUM

The present application claims the priority of Chinese Patent Application No. 2018100766822, filed on Jan. 26, 2018, with the title of "Method and apparatus for recognizing video fine granularity, computer device and storage medium". The disclosure of the above application is incorporated herein by reference in its entirety.

FIELD OF THE DISCLOSURE

The present disclosure relates to fine granularity recognizing technologies, and particularly to a method and apparatus for recognizing video fine granularity, a computer device and a storage medium.

BACKGROUND OF THE DISCLOSURE

Fine granularity recognition is a very hot research subject matter appearing in fields such as computer vision and mode recognition in recent years.

Fine granularity recognition may comprise recognizing different classes of animals such as birds, different classes of flowers, different classes of vehicles, different classes of dishes and the like.

Fine granularity recognition may be applied to different scenarios, for example, video fine granularity recognition.

Video fine granularity recognition means performing fine granularity recognition for targets appearing in video such as vehicles, animals and dishes. For example, regarding a section of video about "oriole", a corresponding fine granularity recognition result should be "oriole".

In the prior art, it is feasible to employ a search-based video fine granularity recognition manner to extract the most fundamental attributes such as color, movement trajectory, shape and structure from targets in the video, and then perform recognition by using a searching method. However, it is difficult to extract subtle differences between different targets in this manner, which causes a lower accuracy of the recognition result.

SUMMARY OF THE DISCLOSURE

In view of the above, the present disclosure provides a method and apparatus for recognizing video fine granularity, a computer device and a storage medium, which can improve accuracy of the recognition result.

Specific technical solutions are as follows:

A method for recognizing video fine granularity, comprising:

performing sampling processing for video to be recognized to obtain n frames of images, n being a positive integer larger than one;

respectively obtaining a feature graph of each frame of image, and determining a summary feature according to respective feature graphs;

determining a fine granularity recognition result of a target in the video according to the summary feature.

According to a preferred embodiment of the present disclosure, the performing sampling processing for video to be recognized comprises:

dividing a RGB frame or optical flow frame of the video into m segments, m being a positive integer larger than one and m being less than or equal to n, and extracting at least one frame of image from each segment.

According to a preferred embodiment of the present disclosure, dividing the RGB frame or optical flow frame into m segments comprises: dividing equally into m segments;

the extracting at least one frame of image from each segment comprises: extracting one frame of image from each segment.

According to a preferred embodiment of the present disclosure, the respectively obtaining a feature graph of each frame of image comprises:

for each frame of image, extracting the feature graph of the image by using a deep neural network model obtained by pre-training.

According to a preferred embodiment of the present disclosure, the determining the summary feature according to respective feature graphs comprises:

considering the feature graphs jointly as a processing object and performing the following predetermined processing:

generating an attention-weighted intermediate summary feature according to the processing object;

determining whether a value of Q is equal to P, P being a positive integer larger than 1, and an initial value of Q being 1;

if yes, determining the summary feature according to the generated intermediate summary feature;

if no, performing redundant texture restraint for the processing object according to the generated intermediate summary feature, adding one to the value of Q, considering the processing object after the redundant texture restraint as a new processing object, and then performing the predetermined processing repeatedly.

According to a preferred embodiment of the present disclosure, each feature graph is comprised of w*h c-dimensional feature vectors, each feature vector represents a feature of a corresponding region in the image, and w and h are respectively equal to a width and a height of the feature graph;

the generating an attention-weighted intermediate summary feature according to the processing object comprises:

performing non-linear transformation for the processing object $X^k$ to obtain a non-linear transformation result $\overline{X}^k$, $\overline{X}^k$ being also comprised of n*w*h c-dimensional feature vectors, $\overline{X}^k$ being also comprised of n*w*h c-dimensional feature vectors;

respectively calculating relevancy between all feature vectors in $\overline{X}^k$ and the c-dimensional predetermined vector, normalizing calculation results, considering a normalization result as a coefficient, calculating a sum of weight of all feature vectors in $\overline{X}^k$, and considering the calculation result as an intermediate summary feature $\hat{X}^k$, $\hat{X}^k$ being the c-dimensional feature vector.

According to a preferred embodiment of the present disclosure, the performing redundant texture restraint for the processing object according to the generated intermediate summary feature comprises:

performing non-linear transformation for the intermediate summary feature $\hat{X}^k$ to obtain a non-linear transformation result $\tilde{X}^k$ which is a c-dimensional feature vector;

respectively adding values of dimensions in $\tilde{X}^k$ respectively to values of dimensions corresponding to respective feature vectors in the processing object $X^k$.

According to a preferred embodiment of the present disclosure, the determining the summary feature according to the generated intermediate summary feature comprises:

adding up the generated intermediate summary features, and considering the sum as the summary feature.

According to a preferred embodiment of the present disclosure, determining the fine granularity recognition result of the target in the video according to the summary feature comprises:

inputting the summary feature to a classifier obtained by pre-training to obtain an output fine granularity recognition result of the target in the video.

An apparatus of recognizing video fine granularity, comprising a sampling unit, an obtaining unit and a recognizing unit;

the sampling unit is configured to perform sampling processing for video to be recognized to obtain n frames of images, n being a positive integer larger than one;

the obtaining unit is configured to respectively obtain a feature graph of each frame of image, and determine a summary feature according to respective feature graphs;

the recognizing unit is configured to determine a fine granularity recognition result of a target in the video according to the summary feature.

According to a preferred embodiment of the present disclosure, the sampling unit divides a RGB frame or optical flow frame of the video into m segments, m being a positive integer larger than one and m being less than or equal to n, and extracts at least one frame of image from each segment.

According to a preferred embodiment of the present disclosure, the sampling unit equally divides the RGB frame or optical flow frame of the video into m segments and extract one frame of image from each segment.

According to a preferred embodiment of the present disclosure, the obtaining unit extracts, for each frame of image, a feature graph of the image by using a deep neural network model obtained by pre-training.

According to a preferred embodiment of the present disclosure, the obtaining unit considers the feature graphs jointly as a processing object and performs the following predetermined processing:

generating an attention-weighted intermediate summary feature according to the processing object;

determining whether a value of Q is equal to P, P being a positive integer larger than 1, and an initial value of Q being 1;

if yes, determining the summary feature according to the generated intermediate summary feature;

if no, performing redundant texture restraint for the processing object according to the generated intermediate summary feature, adding one to the value of Q, considering the processing object after the redundant texture restraint as a new processing object, and then performing the predetermined processing repeatedly.

According to a preferred embodiment of the present disclosure, each feature graph is comprised of w*h c-dimensional feature vectors, each feature vector represents a feature of a corresponding region in the image, and w and h are respectively equal to a width and a height of the feature graph;

the obtaining unit performs non-linear transformation for the processing object $X^k$ to obtain a non-linear transformation result $\overline{X}^k$, $X^k$ being also comprised of n*w*h c-dimensional feature vectors, $\overline{X}^k$ being also comprised of n*w*h c-dimensional feature vectors, respectively calculates relevancy between all feature vectors in $\overline{X}^k$ and the c-dimensional predetermined vector, normalizes calculation results, considers a normalization result as a coefficient, calculates a sum of weight of all feature vectors in $\overline{X}^k$, and considers the calculation result as an intermediate summary feature $\hat{X}^k$, $\hat{X}^k$ being the c-dimensional feature vector.

According to a preferred embodiment of the present disclosure, the obtaining unit performs non-linear transformation for the intermediate summary feature $\hat{X}^k$ to obtain a non-linear transformation result $\tilde{X}^k$ which is a c-dimensional feature vector, and then adds values of dimensions in $\tilde{X}^k$ respectively to values of dimensions corresponding to respective feature vectors in the processing object $X^k$ to complete redundant texture restraint.

According to a preferred embodiment of the present disclosure, the obtaining unit adds up the generated intermediate summary features, and considers the sum as the summary feature.

According to a preferred embodiment of the present disclosure, the recognizing unit inputs the summary feature to a classifier obtained by pre-training to obtain an output fine granularity recognition result of a target in the video.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solutions of the above method embodiments may be employed to first perform sampling processing for the video to be recognized to obtain multiple frames of images, then obtain the feature graph of each frame of images, determine the summary feature according to respective feature graphs, and then determine the fine granularity recognition result of the target in the video according to the summary feature, thereby overcoming the problems existing in the prior art and improving the accuracy of the recognition result.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, embodiments described herein are partial embodiments of the present disclosure, not all embodiments. Based on embodiments of the present disclosure, all other embodiments obtained by those skilled in the art without making any inventive efforts fall within the extent of protection of the present disclosure.

Figure 1:
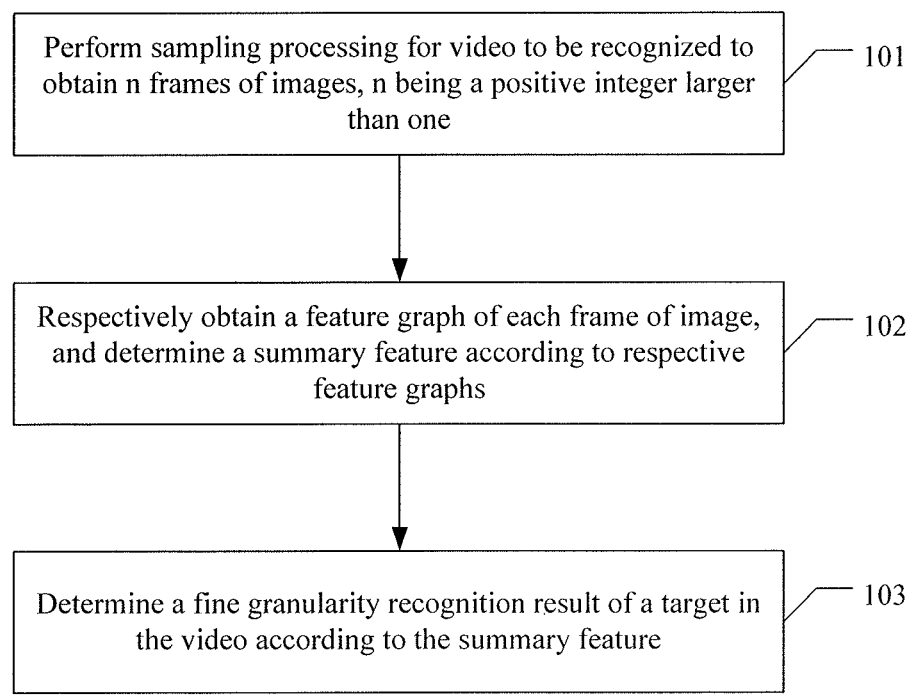
FIG. 1 is a flow chart of a first embodiment of a method for recognizing video fine granularity according to the present disclosure.

FIG. 1 is a flow chart of a first embodiment of a method for recognizing video fine granularity according to the present disclosure. As shown in FIG. 1, the embodiment comprises the following specific implementation mode.

In 101, sampling processing is performed for video to be recognized to obtain n frames of images, n being a positive integer larger than one.

Specifically, it is feasible to divide a RGB frame or optical flow frame of the video into m segments, m being a positive integer larger than one and m being less than or equal to n, and extract at least one frame of image from each segment, wherein the extraction may be random extraction.

That is to say, it is feasible to divide the RGB frame of the video into m segments and extract at least one frame of image from each segment, or it is also feasible to divide the optical flow frames of the video into m segments and extract at least one frame of image from each segment. How to obtain the optical flow frame is of prior art. A specific value of m may depend on actual needs.

Preferably, it is feasible to equally divide the video into m segments and extract one frame of image from each segment. In this case, m is equal to n.

For example, the video includes totally 2000 frames of RGB images, it is equally divided into 100 segments, each segment includes 20 frames of RGB images, and one frame of RGB images are randomly extracted from every 20 frames of RGB images to obtain RGB images extracted from totally 100 frames.

In 102, respectively obtain a feature graph of each frame of image, and determine a summary feature according to respective feature graphs.

First, the feature graph may be extracted from each frame of image by respectively using a deep neural network model obtained by pre-training.

The feature graph is comprised of w*h c-dimensional feature vectors, each feature vector represents a feature of a corresponding region in the image, w and h are respectively equal to a width and a height of the feature graph and their specific values may depend on actual needs.

How to obtain the deep neural network model by training is of prior art.

It can be seen that after the above processing manner is employed, w*h feature vectors are respectively extracted from each frame of image, each feature vector corresponds to a region in the image, and w*h feature vectors correspond to totally w*h regions in the image.

After the feature graph of each frame of image is obtained, the summary features may be determined from respective feature graphs mainly in a manner of combining an attention mechanism and a redundancy-restraining mechanism. First, intermediate summary features are extracted from feature graphs through the attention mechanism, then which feature channels will be restrained is decided according to the intermediate summary features, redundant texture restraint is implemented, and then, cyclic iteration is performed on the basis of the feature graph of redundant texture restraint.

Figure 2:
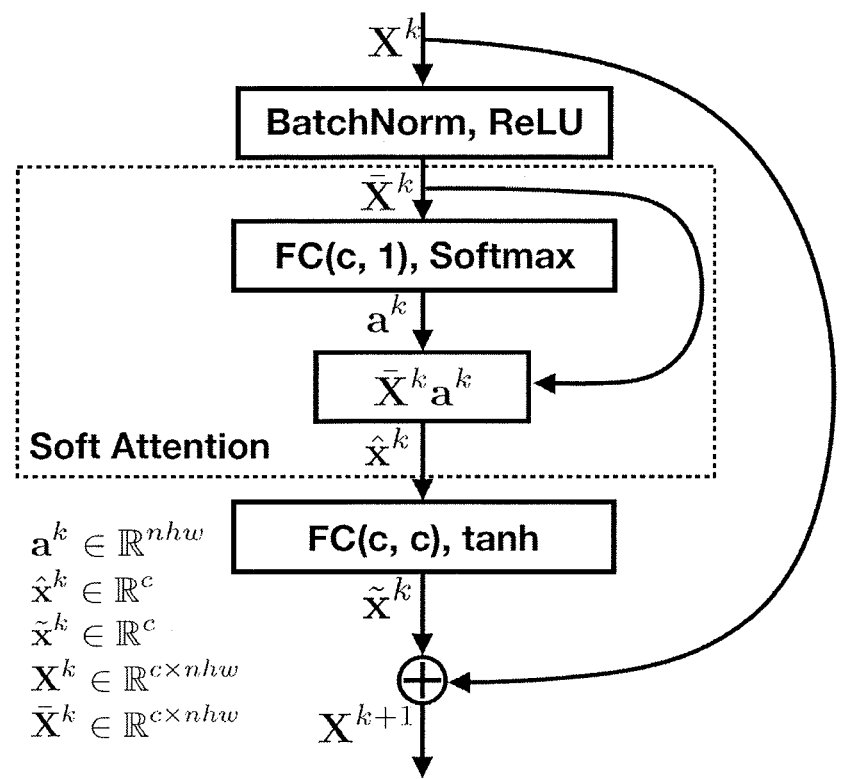
FIG. 2 is a schematic diagram of a manner of combining an attention mechanism and a redundancy restraining mechanism according to the present disclosure.

FIG. 2 is a schematic diagram of a manner of combining an attention mechanism and a redundancy restraining mechanism according to the present disclosure. As shown in FIG. 2, respective feature graphs may be together considered as a processing object, and predetermined processing stated in in the following 1)-2) is performed.

1) Generate an attention-weighted intermediate summary feature according to the processing object.

As stated above, each feature graph is comprised of w*h c-dimensional feature vectors, and then the processing object $X^k$ (n feature graphs) is comprised of n*w*h c-dimensional feature vectors.

First, it is possible to perform non-linear transformation for the processing object $X^k$ to obtain a non-linear transformation result $\overline{X}^k$, and $\overline{X}^k$ is also comprised of n*w*h c-dimensional feature vectors.

Then, it is possible to respectively calculate relevancy between all feature vectors in $\overline{X}^k$ and a c-dimensional predetermined vector, normalize calculation results, consider a normalization result as a coefficient, calculate a sum of weight of all feature vectors in $\overline{X}^k$, and consider the calculation result as an intermediate summary feature $\hat{X}^k$, wherein $\hat{X}^k$ is the c-dimensional feature vector.

The c-dimensional predetermined vector is a parameter provided by a full convolution layer FC. The parameter can reflect degrees to which different locations (regions) help classification. The parameter may be obtained by learning.

Regarding each c-dimensional feature vector in $\overline{X}^k$, it is feasible to respectively calculate the relevancy, namely, an inner product, between the feature vector and the c-dimensional predetermined vector, and normalize the calculation result to obtain a coefficient. As such, a total of n*w*h coefficients may be obtained for n*w*h c-dimensional feature vectors in $\overline{X}^k$.

Then, it is feasible to perform weighting summation for n*w*h c-dimensional feature vectors in $\overline{X}^k$ according to a coefficient (weight) corresponding to each c-dimensional feature vector in $\overline{X}^k$, thereby obtaining the intermediate summary feature $\hat{X}^k$. Obviously, $\hat{X}^k$ is the c-dimensional feature vector.

2) Determine whether a value of Q is equal to P which is a positive integer larger than 1.

A parameter Q may be set with an initial value 1. The specific value of P may depend on actual needs. P represents times of cyclic iterations. For example, P may have a value 3.

If Q=P, a final desired summary feature may be determined according to the generated immediate summary feature $\hat{X}^k$. For example, respective intermediate summary features $\hat{X}^k$ may be added up, and the sum is considered as the final desired summary feature.

If Q is smaller than P, it is possible to perform redundant texture restraint for the processing object $X^k$ according to the generated intermediate summary feature $\hat{X}^k$, add one to the value of Q, consider the processing object $X^{k+1}$ after the redundant texture restraint as a new processing object, and then perform the predetermined processing repeatedly.

Specifically, as shown in FIG. 2, non-linear transformation may be performed for the intermediate summary feature $\hat{X}^k$ to obtain a non-linear transformation result $\tilde{X}^k$ which is the c-dimensional feature vector. For example, it can be predicted through a linear and hyperbolic tangent activation that activation of which feature channels needs to be restrained or enhanced. Each dimension in n-dimensional feature vector is considered as a feature channel, and a value in a corresponding feature vector is activation.

Then, the values of dimensions in $\tilde{X}^k$ may be respectively added to values of dimensions corresponding to respective feature vectors in the processing object $X^k$ to obtain $X^{k+1}$.

Then, it is possible to add one to the value of Q, and repeat the flow shown in FIG. 2 with respect to $X^{k+1}$, namely, consider $X^{k+1}$ as $X^k$ and repeat the flow shown in FIG. 2. It needs to be appreciated that upon cyclic iteration each time, the used parameter such as c-dimensional predetermined vector is usually different.

In 103, a fine granularity recognition result of a target in the video is determined according to the summary feature.

For example, the summary feature may be input to a classifier obtained by pre-training to obtain the output fine granularity recognition result of the target in the video.

How to train to obtain the classifier is of the prior art.

Figure 3:
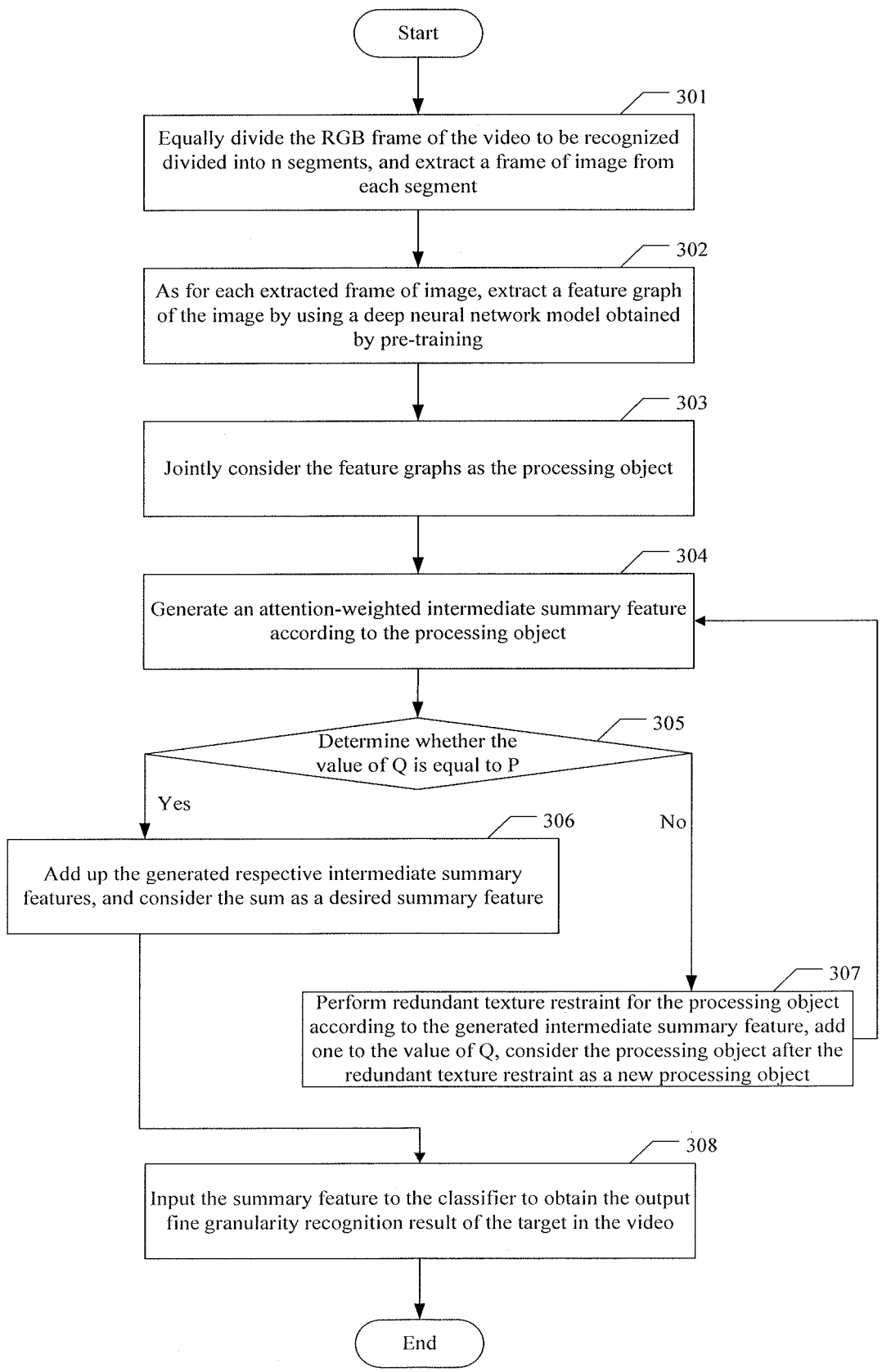
FIG. 3 is a flow chart of a second embodiment of a method for recognizing video fine granularity according to the present disclosure.

Based on the above introduction, FIG. 3 is a flow chart of a second embodiment of a method for recognizing video fine granularity according to the present disclosure. As shown in FIG. 3, the embodiment comprises the following specific implementation mode.

In 301, the RGB frame of the video to be recognized is equally divided into n segments, and a frame of image is extracted from each segment.

n is a positive integer larger than 1. In this way, a total of n frames of images may be extracted.

In 302, as for each extracted frame of image, a feature graph of the image is extracted by using a deep neural network model obtained by pre-training.

Each feature graph is comprised of w*h c-dimensional feature vectors.

A total of n feature graphs may be obtained with respect to the extracted n frames of images.

In 303, the feature graphs are jointly considered as the processing object.

The processing object is comprised of n*w*h c-dimensional feature vectors.

In 304, an attention-weighted intermediate summary feature is generated according to the processing object.

For example, it is possible to perform non-linear transformation for the processing object $X^k$ to obtain a non-linear transformation result $\overline{X}^k$, and $X^k$ is also comprised of n*w*h c-dimensional feature vectors, and $\overline{X}^k$ is also comprised of n*w*h c-dimensional feature vectors.

Then, it is possible to respectively calculate relevancy between all feature vectors in $\overline{X}^k$ and a c-dimensional predetermined vector, normalize calculation results, consider a normalization result as a coefficient, calculate a sum of weight of all feature vectors in $\overline{X}^k$, and consider the calculation result as an intermediate summary feature $\hat{X}^k$, wherein $\hat{X}^k$ is the c-dimensional feature vector.

In 305, determine whether the value of Q is equal to P, perform 306 if yes, and perform 307 if no.

P is a positive integer larger than 1, and the initial value of Q is 1.

In 306, add up the generated respective intermediate summary features, and consider the sum as a desired summary feature, and then perform 308.

307 relates to performing redundant texture restraint for the processing object according to the generated intermediate summary feature, adding one to the value of Q, considering the processing object after the redundant texture restraint as a new processing object, and then performing 304 repeatedly.

For example, it is possible to first perform non-linear transformation for the intermediate summary feature $\hat{X}^k$ to obtain a non-linear transformation result $\tilde{X}^k$ which is a c-dimensional feature vector, and then add the values of dimensions in $\tilde{X}^k$ respectively to values of dimensions corresponding to respective feature vectors in the processing object $X^k$ to achieve redundant texture restraint.

In 308, the summary feature is input to the classifier to obtain the output fine granularity recognition result of the target in the video.

Figure 4:
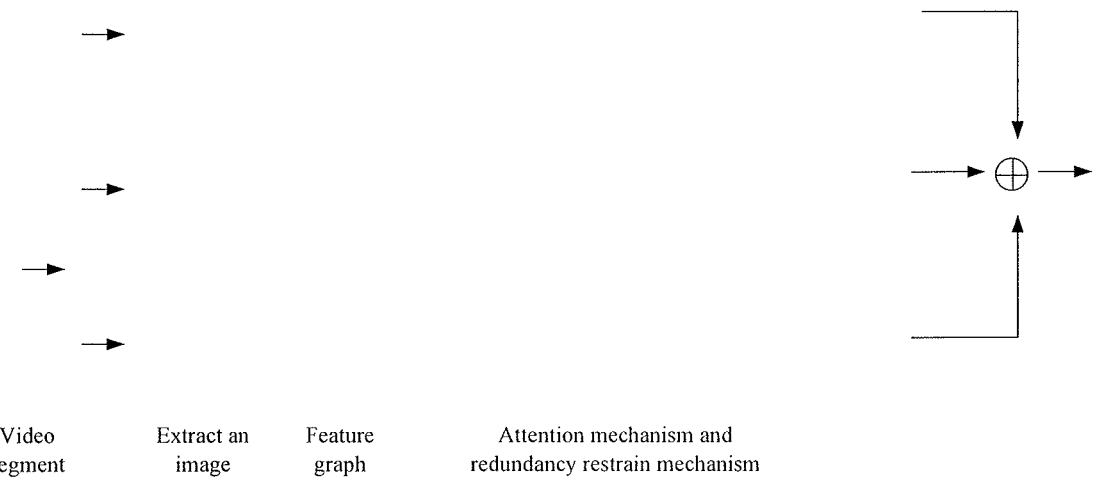
FIG. 4 is a schematic diagram of an overall implementation procedure of the method for recognizing video fine granularity according to the present disclosure.

Summarizing the above introduction, FIG. 4 is a schematic diagram of an overall implementation procedure of the method for recognizing video fine granularity according to the present disclosure. As shown in FIG. 4, first, the video to be recognized is divided into segments, then a frame of image is extracted from each segment, then feature graphs of extracted frame of images are obtained respectively, and then cyclic iteration including generating the intermediate summary feature and performing redundant texture restraint is performed according to the feature graphs of respective frames of images. Assume that a total of three intermediate summary features are obtained, the three intermediate summary features are added up to obtain a sum, and then, the sum may be input to the classifier to obtain the fine granularity recognition result of the target in the video.

As appreciated, for ease of description, the aforesaid method embodiments are all described as a combination of a series of actions, but those skilled in the art should appreciate that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

In one word, the solutions of the above method embodiments may be employed to select features more assistant to classification through the attention mechanism, restrain activation on a specific feature channel to thereby achieve the purpose of restraining the redundant features, and finally complete video fine granularity recognition according to the summary feature obtained from the above processing, thereby improving the accuracy of recognition result.

The above introduces the method embodiments. The solution of the present disclosure will be further described through an apparatus embodiment.

Figure 5:
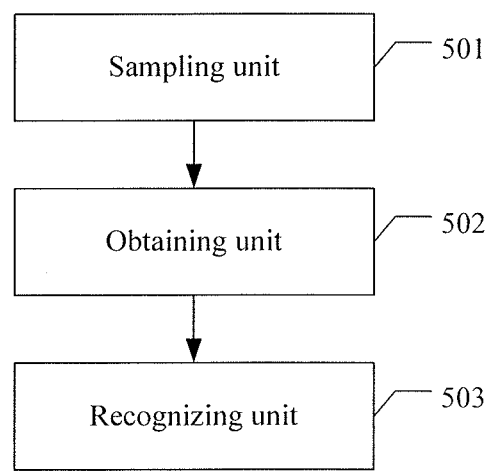
FIG. 5 is a block diagram of an embodiment of an apparatus of recognizing video fine granularity according to the present disclosure.

FIG. 5 is a block diagram of an embodiment of an apparatus of recognizing video fine granularity according to the present disclosure. As shown in FIG. 5, the apparatus comprises: a sampling unit 501, an obtaining unit 502 and a recognizing unit 503.

The sampling unit 501 is configured to perform sampling processing for video to be recognized to obtain n frames of images, n being a positive integer larger than one.

The obtaining unit 502 is configured to respectively obtain a feature graph of each frame of image, and determine a summary feature according to respective feature graphs.

The recognizing unit 503 is configured to determine a fine granularity recognition result of a target in the video according to the summary feature.

Specifically, the sampling unit 501 may divide RGB frame or optical flow frame of the video into m segments, m being a positive integer larger than one and m being less than or equal to n, and extract at least one frame of image from each segment.

Preferably, the sampling unit 501 may equally divide the RGB frame or optical flow frame of the video into m segments and extract one frame of image from each segment.

Then, the obtaining unit 502 may extract, for each extracted frame of image, a feature graph of the image by using a deep neural network model obtained by pre-training.

The feature graph is comprised of w*h c-dimensional feature vectors, each feature vector represents a feature of a corresponding region in the image, and w and h are respectively equal to a width and a height of the feature graph.

Then, the obtaining unit 502 may consider the feature graphs jointly as the processing object and perform the following predetermined processing:

generating an attention-weighted intermediate summary feature according to the processing object;

determining whether the value of Q is equal to P, P being a positive integer larger than 1, and the initial value of Q being 1;

if yes, determining the summary feature according to the generated intermediate summary feature;

if no, performing redundant texture restraint for the processing object according to the generated intermediate summary feature, adding one to the value of Q, considering the processing object after the redundant texture restraint as a new processing object, and then performing the predetermined processing repeatedly.

The obtaining unit 502 may perform non-linear transformation for the processing object $X^k$ to obtain a non-linear transformation result $\overline{X}^k$, $X^k$ being also comprised of n*w*h c-dimensional feature vectors, $\overline{X}^k$ being also comprised of n*w*h c-dimensional feature vectors, respectively calculate relevancy between all feature vectors in $\overline{X}^k$ and a c-dimensional predetermined vector, normalize calculation results, consider a normalization result as a coefficient, calculate a sum of weight of all feature vectors in $\overline{X}^k$, and consider the calculation result as an intermediate summary feature $\hat{X}^k$, wherein $\hat{X}^k$ is the c-dimensional feature vector.

In addition, the obtaining unit 502 may further perform non-linear transformation for the intermediate summary feature $\hat{X}^k$ to obtain a non-linear transformation result $\tilde{X}^k$ which is a c-dimensional feature vector, and then add the values of dimensions in $\tilde{X}^k$ respectively to values of dimensions corresponding to respective feature vectors in the processing object $X^k$ to complete redundant texture restraint.

After the attention-weighted intermediate summary feature is generated according to the processing object, if Q=P, the obtaining unit 502 may add up the generated intermediate summary features, and consider the sum as a final desired summary feature; if Q is not equal to P, the obtaining unit 502 add one to the value of Q, consider the processing object $X^{k+1}$ after the redundant texture restraint as a new processing object, and then perform the predetermined processing repeatedly, namely, performing cyclic iteration, until Q=P.

After the summary feature is obtained, the recognizing unit 503 may input the summary feature to a classifier obtained by pre-training to obtain an output fine granularity recognition result of the target in the video.

Reference may be made to corresponding depictions in the aforesaid method embodiment for a specific workflow of the apparatus embodiment shown in FIG. 5. The workflow is not detailed any more.

Figure 6:
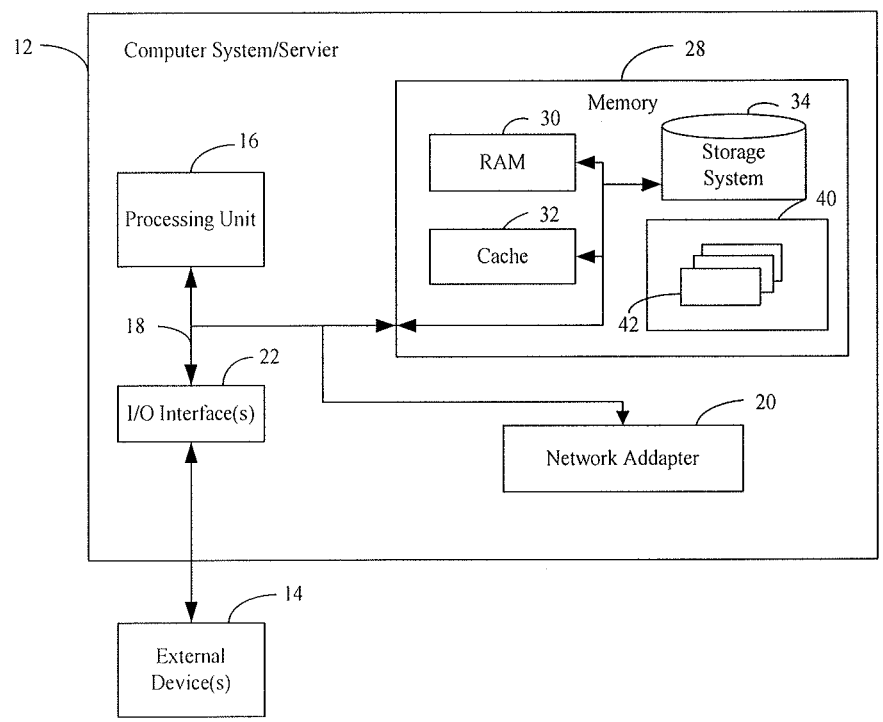
FIG. 6 illustrates a block diagram of an example computer system/server 12 adapted to implement an implementation mode of the present disclosure.

FIG. 6 illustrates a block diagram of an example computer system/server 12 adapted to implement an implementation mode of the present disclosure. The computer system/server 12 shown in FIG. 6 is only an example and should not bring about any limitation to the function and scope of use of the embodiments of the present disclosure.

As shown in FIG. 6, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 6, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1 or 3.

The present disclosure further provides a computer-readable storage medium on which a computer program is stored. The program, when executed by a processor, can implement the method in the embodiment shown in FIG. 1 or 3.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for recognizing video fine granularity, comprising:

performing sampling processing for video to be recognized to obtain n frames of images, n being a positive integer larger than one;

respectively obtaining a feature graph of each frame of image, and determining a summary feature according to respective feature graphs;

determining a fine granularity recognition result of a target in the video according to the summary feature, wherein the determining the summary feature according to respective feature graphs comprises:

considering the feature graphs jointly as a processing object and performing the following predetermined processing:

generating attention-weighted intermediate summary features according to the processing object;

determining whether a value of Q is equal to P, P being a positive integer larger than 1, and an initial value of Q being 1;

if yes, determining the summary feature according to the generated intermediate summary features;

if no, performing redundant texture restraint for the processing object according to the generated intermediate summary features, adding one to the value of Q, considering the processing object after the redundant texture restraint as a new processing object, and performing the predetermined processing repeatedly, and wherein each feature graph is comprised of w*h c-dimensional feature vectors, each feature vector represents a feature of a corresponding region in a corresponding frame of image, and w and h are respectively equal to a width and a height of the feature graph;

the generating attention-weighted intermediate summary features according to the processing object comprises:

performing non-linear transformation for the processing object $X^k$ to obtain a non-linear transformation result $\overline{X}^k$, $X^k$ being comprised of n*w*h c-dimensional feature vectors, $\overline{X}^k$ being also comprised of n*w*h c-dimensional feature vectors;

respectively calculating relevancy between each feature vectors in $\overline{X}^k$ and a c-dimensional predetermined vector, normalizing calculation results, considering a normalization result as a coefficient, calculating a sum of weight of all feature vectors in $\overline{X}^k$, and considering the sum as intermediate summary feature $\hat{X}^k$, $\hat{X}^k$ being a c-dimensional feature vector.

2. The method according to claim 1, wherein,
the performing sampling processing for video to be recognized comprises:
dividing a RGB frame or optical flow frame of the video into m segments, m being a positive integer larger than one and m being less than or equal to n, and extracting at least one frame of image from each segment.

3. The method according to claim 2, wherein
the dividing the RGB frame or optical flow frame into m segments comprises: dividing equally into m segments;
the extracting at least one frame of image from each segment comprises: extracting one frame of image from each segment.

4. The method according to claim 1, wherein,
the respectively obtaining a feature graph of each frame of image comprises:
for each frame of image, extracting the feature graph of the image by using a deep neural network model obtained by pre-training.

5. The method according to claim 1, wherein,
the performing redundant texture restraint for the processing object according to the generated intermediate summary features comprises:
performing non-linear transformation for intermediate summary feature $\hat{X}^k$, to obtain a non-linear transformation result $\hat{X}^k$ which is the c-dimensional feature vector;
respectively adding values of respective dimensions in $\hat{X}^k$ to values of dimensions corresponding to respective feature vectors in the processing object $X^k$.

6. The method according to claim 1, wherein,
the determining the summary feature according to the generated intermediate summary features comprises:
adding up the generated intermediate summary features a second sum, and considering the second sum as the summary feature.

7. The method according to claim 1, wherein
the determining the fine granularity recognition result of the target in the video according to the summary feature comprises:
inputting the summary feature to a classifier obtained by pre-training to obtain an output fine granularity recognition result of the target in the video.

8. A computer device, comprising a memory, a processor and a computer program which is stored on the memory and runs on the processor, wherein the processor, upon executing the program, implements the following operation:
performing sampling processing for video to be recognized to obtain n frames of images, n being a positive integer larger than one;

respectively obtaining a feature graph of each frame of image, and determining a summary feature according to respective feature graphs;

determining a fine granularity recognition result of a target in the video according to the summary feature,
wherein
the determining the summary feature according to respective feature graphs comprises:
considering the feature graphs jointly as a processing object and performing the following predetermined processing:
generating attention-weighted intermediate summary features according to the processing object;
determining whether a value of Q is equal to P, P being a positive integer larger than 1, and an initial value of Q being 1;
if yes, determining the summary feature according to the generated intermediate summary features;
if no, performing redundant texture restraint for the processing object according to the generated intermediate summary features, adding one to the value of Q, considering the processing object after the redundant texture restraint as a new processing object, and performing the predetermined processing repeatedly,
and wherein
each feature graph is comprised of w*h c-dimensional feature vectors, each feature vector represents a feature of a corresponding region in a corresponding frame of image, and w and h are respectively equal to a width and a height of the feature graph;
the generating attention-weighted intermediate summary features according to the processing object comprises:
performing non-linear transformation for the processing object $X^k$ to obtain a non-linear transformation result $\overline{X}^k$, $X^k$ being comprised of n*w*h c-dimensional feature vectors, $\overline{X}^k$ being also comprised of n*w*h c-dimensional feature vectors;
respectively calculating relevancy between each feature vectors in $\overline{X}^k$ and a c-dimensional predetermined vector, normalizing calculation results, considering a normalization result as a coefficient, calculating a sum of weight of all feature vectors in $\overline{X}^k$, and considering the sum as intermediate summary feature $\hat{X}^k$, $\hat{X}^k$ being a c-dimensional feature vector.

9. The computer device according to claim 8, wherein,
the performing sampling processing for video to be recognized comprises:
dividing a RGB frame or optical flow frame of the video into m segments, m being a positive integer larger than one and m being less than or equal to n, and extracting at least one frame of image from each segment.

10. The computer device according to claim 9, wherein,
the dividing the RGB frame or optical flow frame into m segments comprises: dividing equally into m segments;
the extracting at least one frame of image from each segment comprises: extracting one frame of image from each segment.

11. The computer device according to claim 8, wherein,
the respectively obtaining a feature graph of each frame of image comprises:
for each frame of image, extracting the feature graph of the image by using a deep neural network model obtained by pre-training.

12. The computer device according to claim 8, wherein,
the performing redundant texture restraint for the processing object according to the generated intermediate summary features comprises:

performing non-linear transformation for intermediate summary feature $\hat{X}^k$ to obtain a non-linear transformation result $\tilde{X}^k$ which is the c-dimensional feature vector;

respectively adding values of respective dimensions in $\tilde{X}^k$ to values of dimensions corresponding to respective feature vectors in the processing object $X^k$.

13. The computer device according to claim 8, wherein, the determining the summary feature according to the generated intermediate summary features comprises:
adding up the generated intermediate summary features as a second sum, and considering the second sum as the summary feature.

14. The computer device according to claim 8, wherein, the determining the fine granularity recognition result of the target in the video according to the summary feature comprises:
inputting the summary feature to a classifier obtained by pre-training to obtain an output fine granularity recognition result of the target in the video.

15. A non-transitory computer-readable storage medium on which a computer program is stored, wherein the program, when executed by the processor, implements the following operation:
performing sampling processing for video to be recognized to obtain n frames of images, n being a positive integer larger than one;
respectively obtaining a feature graph of each frame of image, and determining a summary feature according to respective feature graphs;
determining a fine granularity recognition result of a target in the video according to the summary feature, wherein
the determining the summary feature according to respective feature graphs comprises:
considering the feature graphs jointly as a processing object and performing the following predetermined processing:
generating attention-weighted intermediate summary features according to the processing object;
determining whether a value of Q is equal to P, P being a positive integer larger than 1, and an initial value of Q being 1;
if yes, determining the summary feature according to the generated intermediate summary features;
if no, performing redundant texture restraint for the processing object according to the generated intermediate summary features, adding one to the value of Q, considering the processing object after the redundant texture restraint as a new processing object, and performing the predetermined processing repeatedly,
and wherein
each feature graph is comprised of w*h c-dimensional feature vectors, each feature vector represents a feature of a corresponding region in a corresponding frame of image, and w and h are respectively equal to a width and a height of the feature graph;
the generating attention-weighted intermediate summary features according to the processing object comprises:
performing non-linear transformation for the processing object $X^k$ to obtain a non-linear transformation result $\overline{X}^k$, $X^k$ being comprised of n*w*h c-dimensional feature vectors, $\overline{X}^k$ being also comprised of n*w*h c-dimensional feature vectors;
respectively calculating relevancy between each feature vectors in $\overline{X}^k$ and a c-dimensional predetermined vector, normalizing calculation results, considering a normalization result as a coefficient, calculating a sum of weight of all feature vectors in $\overline{X}^k$, and considering the sum as intermediate summary feature $\hat{X}^k$, $\hat{X}^k$ being a c-dimensional feature vector.

16. The non-transitory computer-readable storage medium according to claim 15, wherein,
the performing sampling processing for video to be recognized comprises:
dividing a RGB frame or optical flow frame of the video into m segments, m being a positive integer larger than one and m being less than or equal to n, and extracting at least one frame of image from each segment.

17. The non-transitory computer-readable storage medium according to claim 16, wherein,
the dividing the RGB frame or optical flow frame into m segments comprises: dividing equally into m segments;
the extracting at least one frame of image from each segment comprises: extracting one frame of image from each segment.

18. The non-transitory computer-readable storage medium according to claim 15, wherein,
the respectively obtaining a feature graph of each frame of image comprises:
for each frame of image, extracting the feature graph of the image by using a deep neural network model obtained by pre-training.

19. The non-transitory computer-readable storage medium according to claim 15, wherein,
the performing redundant texture restraint for the processing object according to the generated intermediate summary features comprises:
performing non-linear transformation for intermediate summary feature $\hat{X}^k$ to obtain a non-linear transformation result $\tilde{X}^k$ which is the c-dimensional feature vector;
respectively adding values of respective dimensions in $\tilde{X}^k$ to values of dimensions corresponding to respective feature vectors in the processing object $X^k$.

20. The non-transitory computer-readable storage medium according to claim 15, wherein,
the determining the summary feature according to the generated intermediate summary features comprises:
adding up the generated intermediate summary features as a second sum, and considering the second sum as the summary feature.

21. The non-transitory computer-readable storage medium according to claim 15, wherein,
the determining the fine granularity recognition result of the target in the video according to the summary feature comprises:
inputting the summary feature to a classifier obtained by pre-training to obtain an output fine granularity recognition result of the target in the video.

* * * * *